US010910703B2

(12) United States Patent
Kim et al.

(10) Patent No.: US 10,910,703 B2
(45) Date of Patent: Feb. 2, 2021

(54) ANTENNA SYSTEM LOADED IN VEHICLE

(71) Applicant: LG ELECTRONICS INC., Seoul (KR)

(72) Inventors: Yongkon Kim, Seoul (KR); Changwoo Son, Seoul (KR); Cheolsoo Jeon, Seoul (KR); Sunin Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 69 days.

(21) Appl. No.: 16/423,827

(22) Filed: May 28, 2019

(65) Prior Publication Data
US 2020/0185819 A1 Jun. 11, 2020

(30) Foreign Application Priority Data

Dec. 10, 2018 (KR) .................. PCT/KR2018/015631

(51) Int. Cl.
*H01Q 1/32* (2006.01)
*H04B 7/04* (2017.01)
*H01Q 1/24* (2006.01)
*H04B 7/0456* (2017.01)
*H04B 7/06* (2006.01)

(52) U.S. Cl.
CPC .......... *H01Q 1/3275* (2013.01); *H01Q 1/241* (2013.01); *H04B 7/0456* (2013.01); *H04B 7/0617* (2013.01)

(58) Field of Classification Search
CPC ........ H01Q 1/32; H01Q 1/325; H01Q 1/3275; H01Q 1/24; H01Q 1/241; H04B 7/0452; H04B 7/0456; H04B 7/0617; H04B 7/0695
See application file for complete search history.

(56) References Cited

U.S. PATENT DOCUMENTS

| 2014/0028507 | A1  | 1/2014 | Mierke et al. |
| 2018/0019612 | A1  | 1/2018 | Ortigosa et al. |
| 2018/0159208 | A1  | 6/2018 | Ameri |
| 2019/0260457 | A1* | 8/2019 | Hwang ................. H04B 7/086 |

FOREIGN PATENT DOCUMENTS

| KR | 10-1618128 B1 | 5/2016 |
| KR | 10-2018-0025066 A | 3/2018 |

* cited by examiner

*Primary Examiner* — Jimmy T Vu
(74) *Attorney, Agent, or Firm* — Birch, Stewart, Kolasch & Birch & LLP

(57) ABSTRACT

An antenna system loaded in a vehicle according to the present invention includes a first antenna system having a plurality of first antenna elements disposed within a structure mounted in the vehicle, to perform Multi Input Multi Output (MIMO), and a second antenna system having a plurality of second antenna elements attached to side surfaces of a polyhedron disposed within the structure, to perform beamforming, wherein the plurality of first antenna elements is provided on substrates, arranged on the structure by predetermined angles, at front and rear sides of the polyhedron, whereby an antenna arrangement structure with an optimized isolation characteristic among antenna elements can be provided in a flat vehicle antenna having an LTE antenna system and a 5G antenna system.

20 Claims, 9 Drawing Sheets

FIG. 1
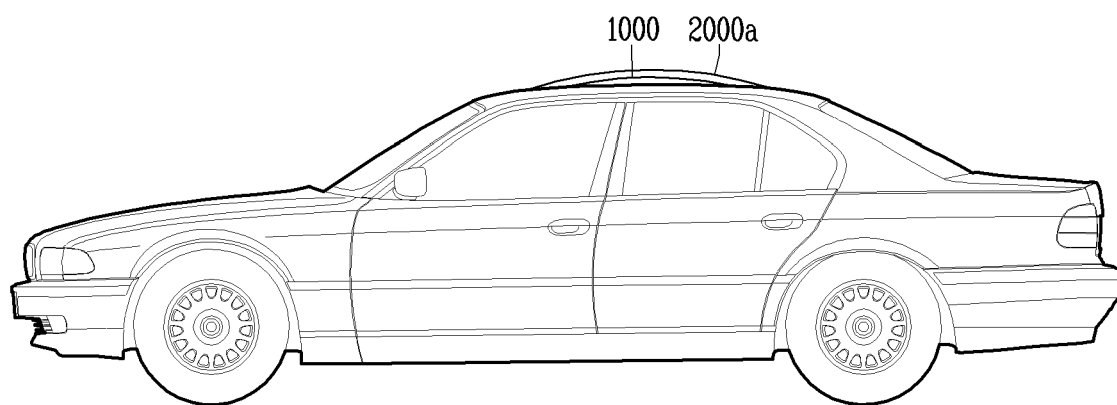
(a)
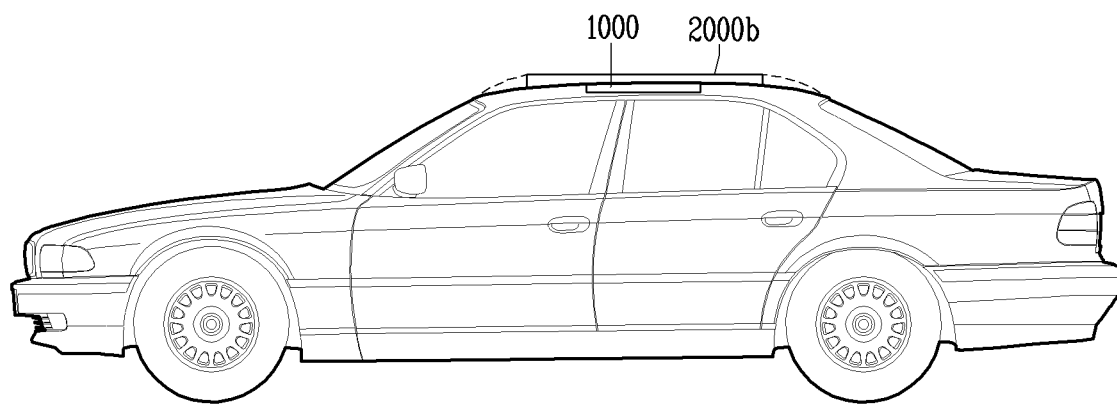
(b)

ANTENNA SYSTEM LOADED IN VEHICLE

CROSS-REFERENCE TO RELATED APPLICATIONS

Pursuant to 35 USC § 119, this application claims the benefit of an earlier filing date and right of priority to International Application No. PCT/KR2018/015631 filed Dec. 10, 2018, the contents of which are hereby incorporated by reference herein in its entirety.

TECHNICAL FIELD

The present invention relates to an antenna system loaded in a vehicle, and more particularly, to an antenna system loaded in a vehicle for providing communication services by transmitting and receiving a plurality of communication signals.

BACKGROUND ART

Terminals may be divided into mobile/portable devices and stationary devices according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, there is an increasing need to provide communication services and multimedia services by mounting such mobile terminals in vehicles. Meanwhile, there is a need for a fifth generation (5G) communication service, which is a next generation communication service, as well as existing communication services such as LTE (Long Term Evolution) and the like in relation to communication services.

In this regard, discussion on the specification of the 5G communication service has not been completed, and an antenna system and a communication system for realizing such a service in the vehicle have not been discussed. In addition, a detailed method for implementing a flat antenna in relation to a method of loading a vehicle antenna system in a vehicle has not been presented.

On the other hand, when the antenna system is disposed at the flat antenna, it is not easy to arrange other types of antennas other than a narrow-band antenna, such as a patch antenna. Further, in case where a configuration including an antenna is disposed within a radome in a vertically erected manner, it cannot be provided in the form of a flat antenna.

However, as described above, if a structure like the related art shark type antenna is used as it is for using another type of antenna, there is a problem that a height is increased.

In such a plurality of communication systems and a plurality of antenna systems, when an antenna of a 4G communication system such as LTE and an antenna of a 5G communication system are arranged, isolation considering interference between them is important. In this regard, it is particularly important in LTE re-farming in which an antenna of a 5G communication system operates in a sub-6 band of 6 GHz or less or partially uses a frequency band of a 4G communication system. Therefore, there is a problem in that a method of ensuring sufficient isolation between antennas of a plurality of communication systems, in consideration of their sizes loadable in a vehicle, has not been specifically presented.

DETAILED DESCRIPTION OF THE DISCLOSURE

One aspect of the present invention is to provide an antenna arrangement structure with a reduced mutual interference characteristic and an optimized size, in a flat vehicle antenna which is capable of providing next generation communication services as well as existing mobile communication services.

Another aspect of the present invention is to provide an antenna arrangement structure in a shark fin-shaped structure and a telematics type structure, in a vehicle antenna system having a plurality of antennas providing a plurality of communication services.

An antenna system loaded in a vehicle according to the present invention includes a first antenna system having a plurality of first antenna elements disposed within a structure mounted in the vehicle, to perform Multi Input Multi Output (MIMO), and a second antenna system having a plurality of second antenna elements attached to side surfaces of a polyhedron disposed within the structure, to perform beamforming, wherein the plurality of first antenna elements is provided on substrates, erected on the structure by predetermined angles, at front and rear sides of the polyhedron, whereby an antenna arrangement structure with an optimized isolation characteristic among antenna elements can be provided in a flat vehicle antenna having an LTE antenna system and a 5G antenna system.

According to one embodiment, the structure may be configured as a shark fin-shaped radome.

According to one embodiment, the plurality of second antenna elements may include first to fourth array antennas attached to four side surfaces of the polyhedron. At this time, the first to fourth array antennas may operate to transmit or receive a second signal in a fifth generation (5G) communication system.

According to one embodiment, the polyhedron may have first and second side surfaces that are arranged to form a first angle as a predetermined angle in left and right directions with respect to one point of a symmetric line of a bottom surface of the structure. On the other hand, the polyhedron may have third and fourth side surfaces that are arranged to form a second angle as a predetermined angle in the left and right directions with respect to another point of the symmetric line. At this time, the first to fourth array antennas may be disposed on the first to fourth side surfaces.

According to one embodiment, the first side surface and the second side surface may have a first interface formed therebetween, and the third side surface and the fourth side surface may have a second interface formed therebetween.

At this time, the first interface may have a width wider than a width of a first substrate perpendicularly erected on the structure at the front of the polyhedron, and the second interface may have a width wider than a width of a second substrate perpendicularly erected on the structure at the rear of the polyhedron.

According to one embodiment, the first angle may be determined in consideration of interference with a first long-term evolution (LTE) antenna attached to the first substrate, and the second angle may be determined in consideration of interference with a second LTE antenna attached to the second substrate.

According to one embodiment, the antenna system may further include a satellite broadcasting (Digital Multimedia Broadcasting; DMB) antenna attached to a third substrate perpendicularly erected on the structure between the first LTE antenna and the polyhedron.

According to one embodiment, the system may further include an FM receiving antenna attached to a fourth substrate perpendicularly erected on the structure between the second LTE antenna and the polyhedron.

According to one embodiment, a GPS antenna may be disposed at the front of the satellite broadcasting (DMB) antenna. At this time, the GPS antenna may be a patch antenna printed on a substrate disposed on a bottom surface of the structure.

According to one embodiment, the system may further include a plurality of third antenna elements disposed on a plurality of substrates, respectively, perpendicularly erected on the structure with being spaced apart from the four side surfaces of the polyhedron by predetermined distances.

According to one embodiment, the plurality of second antenna elements may be first to fourth array antennas operating in a millimeter wave (mmWave) band. On the other hand, the plurality of third antenna elements may be first to fourth sub-6 antennas operating in a sub-6 band of 6 GHz or less.

According to one embodiment, the first to fourth sub-6 antennas may transmit or receive a first signal in a first communication system as an LTE communication system in a first frequency band. In addition, the first to fourth sub-6 antennas may transmit or receive a second signal in a second communication system as a 5G communication system in a second frequency band different from the first frequency band.

According to one embodiment, the plurality of substrates on which the first to fourth sub-6 antennas are provided may be disposed in a manner that outermost portions thereof are disposed on a bottom surface of the structure in a shape of a shark fin within the structure.

According to another aspect of the present invention, there is provided an antenna system loaded in a vehicle, the system including a first antenna system having a plurality of first antenna elements disposed within a first structure mounted in the vehicle, to transmit or receive a first signal, and a second antenna system having a plurality of second antenna elements disposed in a second structure to which the first structure is attached, to transmit or receive a second signal, and wherein the plurality of first antenna elements are provided on substrates, erected on the structure by predetermined angles, at front and rear sides of the polyhedron.

According to one embodiment, the first structure may be configured as a shark fin-shaped radome, and the second structure may be provided with a coupling portion to which the shark fin-shaped radome is attached.

According to one embodiment, the plurality of second antenna elements as first to fourth array antennas may be disposed in a flat structure of the second structure. At this time, the first to fourth array antennas may operate to transmit or receive a second signal through beamforming in a fifth generation (5G) communication system.

According to one embodiment, a first substrate on which the first antenna element is printed may be disposed perpendicularly on a bottom surface of the first structure within the first structure. At this time, the first substrate and the second substrate may be disposed in a lengthwise direction of the first structure so as to minimize a width of the first structure.

According to one embodiment, the system may further include a satellite broadcasting (Digital Multimedia Broadcasting; DMB) antenna attached to a third substrate perpendicularly erected on the first structure at the front of the first antenna element, and an FM receiving antenna attached to a fourth substrate perpendicularly erected on the first structure at the rear of the first antenna element.

According to one embodiment, a GPS antenna may be disposed at the front of the satellite broadcasting (DMB) antenna. In this case, the GPS antenna may be a patch antenna printed on a substrate disposed on a bottom surface of the first structure.

According to one embodiment, the shark fin-shaped radome may include a base radome coupled to the bottom surface of the first structure, and an upper radome formed integrally with the base radome and having a curved shape to accommodate a polyhedral structure therein. Also, the base radome and the upper radome may include a flat portion formed in a flat shape at a central portion thereof to prevent scattering of radio waves in the vicinity of the central portion.

Effects of the Disclosure

Hereinafter, effects of an antenna system loaded in a vehicle and a method of controlling the same according to the present invention will be described.

According to at least one embodiment of the present invention, there is an advantage in that an optimized antenna arrangement structure can be provided within a shark fin-shaped structure of a plurality of antenna systems.

According to at least one embodiment of the present invention, an optimized antenna arrangement structure which appropriately utilizes a shark fin-shaped structure and a telematics-type structure can be provided in a flat vehicle antenna having an LTE antenna system and a 5G antenna system.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 1 is a view illustrating a structure for mounting an antenna system in a vehicle, in a mobile terminal having the antenna system loaded in the vehicle.

BEST MODE OF THE DISCLOSURE

Figure 2:
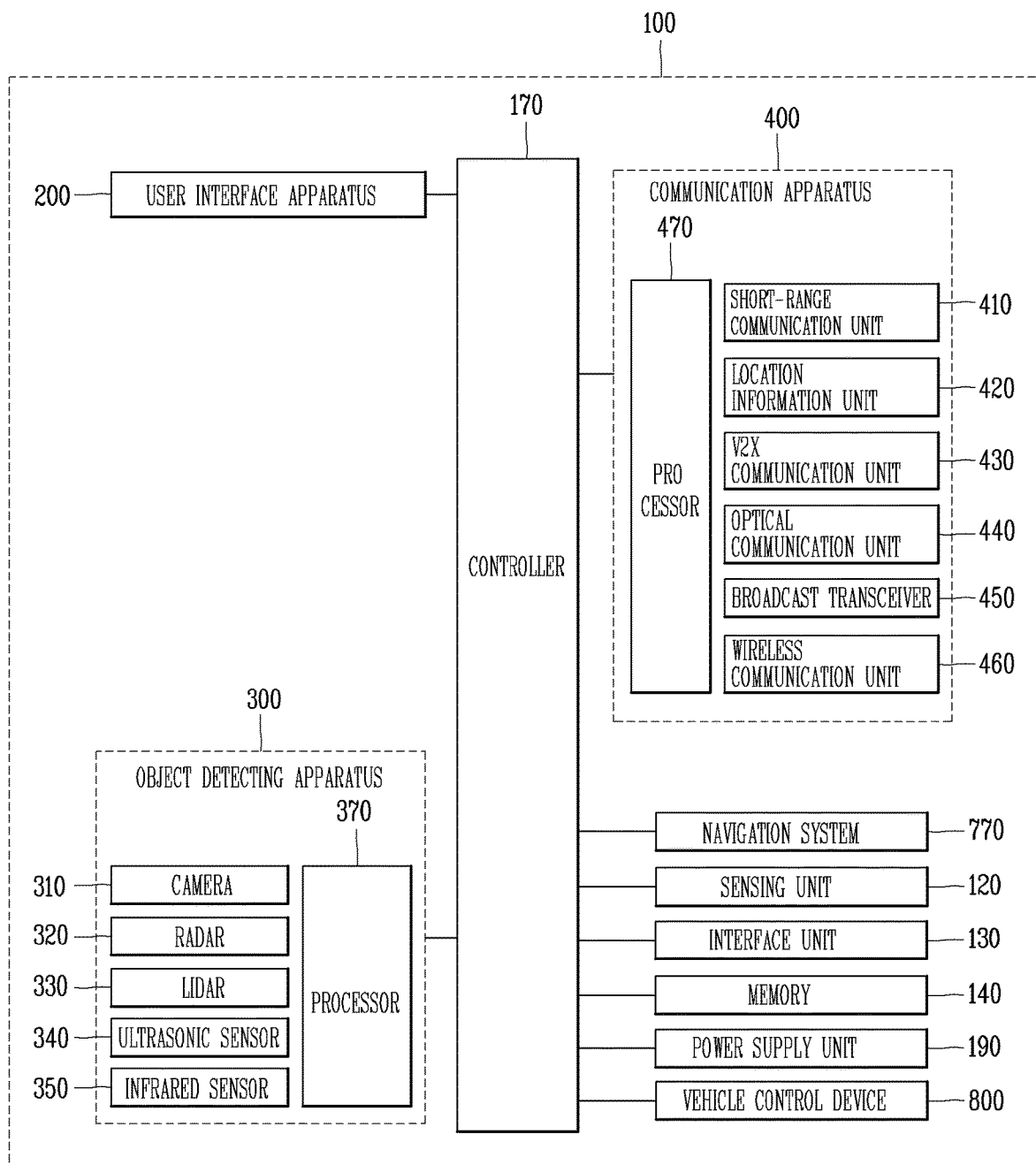
FIG. 2 is a block diagram illustrating a vehicle in accordance with an embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The mobile terminal described in this specification may include a mobile terminal mounted in a vehicle. Examples of the mobile terminal disclosed herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs), etc.), and the like, which can be used in the vehicle if necessary.

On the other hand, the mobile terminal disclosed in this specification mainly refers to a vehicle terminal implemented by an antenna system mounted in a vehicle, but may also include a mobile terminal (electronic device) located inside a vehicle or possessed by a user aboard the vehicle.

FIG. 1 is a view illustrating a structure for mounting an antenna system in a vehicle in a mobile terminal having the antenna system loaded in the vehicle. In this regard, (a) of FIG. 1 shows a configuration in which the antenna system 1000 is loaded on a roof of the vehicle. On the other hand, (b) of FIG. 1 shows a structure in which the antenna system 1000 is loaded in a roof of a vehicle.

Referring to FIG. 1, in order to improve the appearance of the vehicle and to maintain a telematics performance at the time of collision, an existing shark fin antenna is replaced with a flat antenna of a non-protruding shape. In addition, the present invention proposes an integrated antenna of an LTE antenna and a 5G millimeter wave (mmWave) antenna considering fifth generation (5G) communication after 2020, while providing the existing mobile communication service (e.g., LTE). In this regard, the LTE antenna may be an LTE 4×4 MIMO (Multi-Input Multi-Output) antenna. In addition, the present invention proposes a package type antenna for enhancing durability of a patch antenna mounted inside from an impact.

Referring to (a) of FIG. 1, the antenna system 1000 is configured as a hexahedral structure and is disposed on a roof of the vehicle. In (a) of FIG. 1, a radome 2000a for protecting the antenna system 1000 from an external environment and external shocks while the vehicle travels may cover the antenna system 1000. The radome 2000a may be made of a dielectric material through which radio signals are transmitted/received between the antenna system 1000 and a base station.

Referring to (b) of FIG. 1, the antenna system 1000 may be disposed within a roof structure of the vehicle, and at least part of the roof structure may be made of a non-metallic material. At this time, the at least part of the roof structure 2000b of the vehicle may be realized by a non-metallic material, and may be made of a dielectric material through which radio signals are transmitted/received between the antenna system 1000 and the base station.

Meanwhile, the antenna system 1000 may be installed on a front or rear surface of the vehicle depending on applications other than the roof structure of the vehicle.

FIG. 2 is a block diagram illustrating a vehicle in accordance with an embodiment of the present invention.

As illustrated in FIGS. 1 and 2, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The object detecting apparatus 300 is an apparatus for detecting an object located at outside of the vehicle 100.

The object may be a variety of objects associated with driving (operation) of the vehicle 100.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 related to the present invention can operate in any one of a manual driving mode and an autonomous driving mode. That is, the driving modes of the vehicle 100 may include the manual driving mode and the autonomous driving mode.

Figure 3:
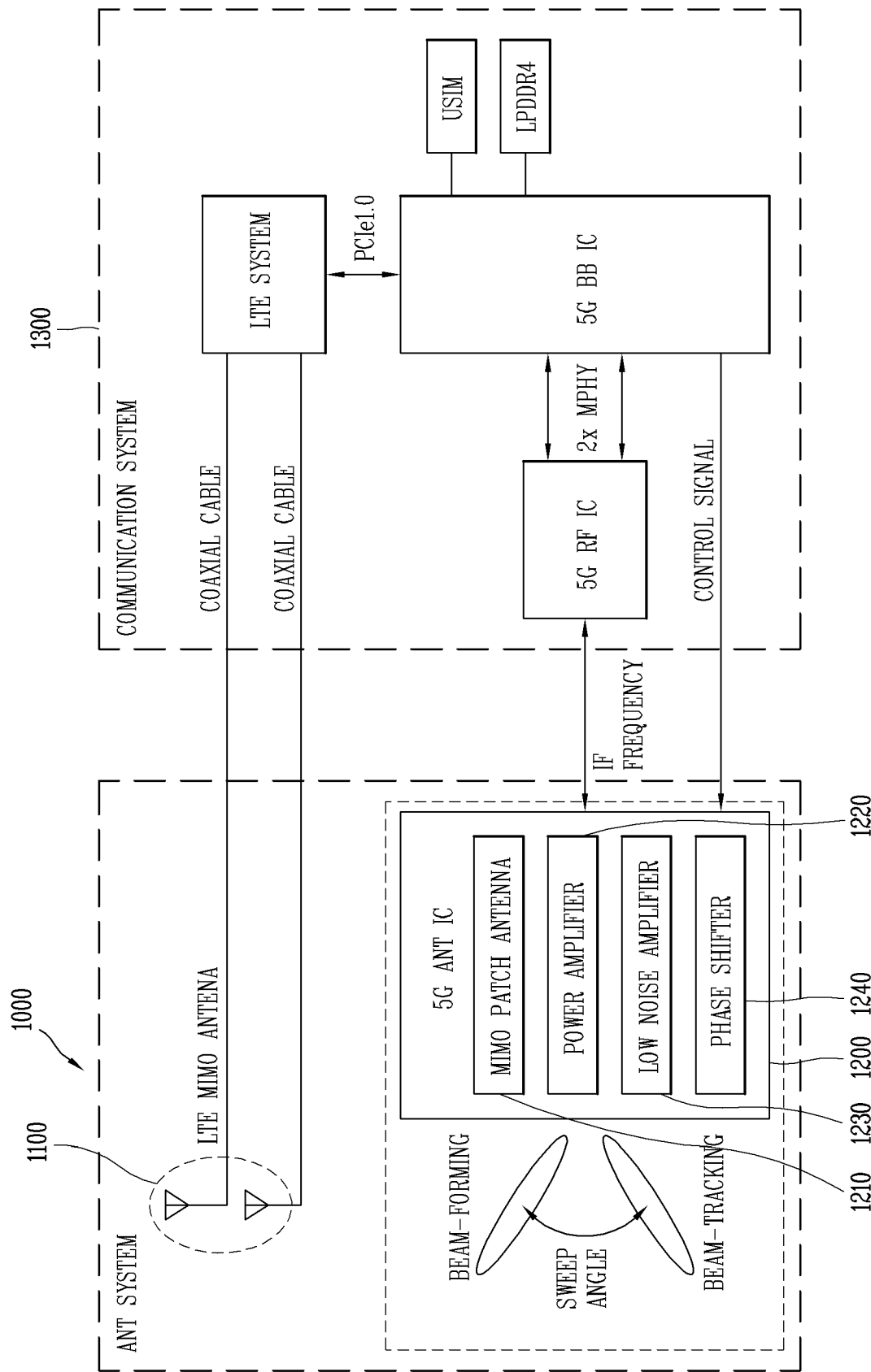
FIG. 3 is a view illustrating a detailed configuration of an antenna system including a communication module and an antenna module according to the present invention.

Meanwhile, FIG. 3 is a view illustrating a detailed configuration of an antenna system including a communication module and an antenna module according to the present invention.

As illustrated in FIG. 3, the antenna system 1000 includes first and second communication systems (or first and second antenna systems) 1100 and 1200, which are each coupled to a communication system 1300. Here, the communication system 1300 may be referred to as a telematics module or a communication module. Meanwhile, the communication system 1300 may be related to the communication device 400 illustrated in FIG. 2, more specifically, the wireless communication unit 460. The communication system 1300 may operate based on information input from the user interface apparatus 200 and may display information received through the communication system 1300 on the user interface apparatus 200.

In addition, the communication system 1300 may control the object detection apparatus 300 to perform a specific operation, and may operate based on information received from the object detection apparatus 300.

Meanwhile, a link connection state between the first and second antenna systems 1100 and 1200 will be described below. According to one embodiment, the first communication system 1100 and the second communication system 1200 may be configured to maintain a dual connectivity state. At this time, a first signal may be received from the second communication system 1100 when a second signal is not received from the second communication system 1200. That is, since the first communication system 200 always maintains the connection state even when a link connection with a base station is released in the second communication system 1200, the second signal may be received from the second communication system 1200. According to another embodiment, when the link connection through the second communication system 1200 is released, a fall back mode in which a connection with the first communication system 1100 is initiated is also be activated. Here, the first and second communication systems may be an LTE communication system and a 5G communication system, respectively, but are not limited thereto and can be freely changed according to applications.

The first antenna system 1100 may be configured to exchange radio signals with existing mobile communication systems (2G/3G/4G) and include a plurality of antenna elements 1110. The first antenna system 1100 may operate in a MIMO mode to receive a plurality of stream signals from a base station via the plurality of antenna elements. In this regard, the plurality of antennas may be two or four antennas, and the first antenna system 1100 may support 2×2 and 4×4 MIMO modes. In this case, the 2×2 and 4×4 MIMO modes correspond to a case where one terminal (vehicle) receives two stream signals and four stream signals transmitted from the base station, respectively. As described above, a case where a single terminal (vehicle) receives a plurality of streams from a base station may be referred to as a single user (SU)-MIMO mode. On the other hand, a case where a plurality of terminals (vehicles) receives the plurality of streams, respectively, may be referred to as an MU-MIMO mode. In order to support the SU-MIMO mode, the second antenna system 1200 must include a plurality of antenna elements.

The second antenna system 1200 may include 1210, a power amplifier 1220, a low noise amplifier (LNA) 1230, and a phase shifter 1240. On the other hand, the second antenna system 1200 may be configured to operate in a frequency band of 28 GHz, a frequency band of 20, 30, 60 GHz, or a sub-6 frequency band below 6 GHz.

The antenna 1210 may be disposed on a dielectric substrate in the form of a patch antenna. For example, the patch antenna 110 may be implemented in the form of a microstrip in which a radiating element and a ground plane are disposed on a top surface and a bottom surface of a dielectric substrate, respectively.

In the case of being configured as the array antenna of the second antenna system 1200, phase values applied to each element of the array antenna are controlled through the phase shifter 1240 to perform beamforming (beam-scanning). For example, the beamforming may be performed within a specific angular range in an azimuth direction and an elevation direction. In this regard, the second antenna system may generate a null pattern of a beam in an interference signal direction while performing beamforming in a desired direction of the azimuth and elevation directions according to the change of the phase values by the phase shifter 1240. Meanwhile, the antenna 1210 may operate as a single antenna element by applying power only to one of the plurality of antenna elements of the array antenna.

That is, in relation to the antenna 1210, the configuration of the array antenna and the single antenna element may be variably configured according to power-on/off and a circuit configuration capable of supporting it. Therefore, when the signal level (or signal-to-interference ratio) is sufficient by virtue of a sufficiently close distance with the base station or another communication target device, the patch antenna 110 is variably configured as a single antenna element. On the other hand, when the signal level (or signal-to-interference ratio) is not sufficient, the antenna 1210 is variably configured as an array antenna.

The antenna 1210 may operate simultaneously as a transmission antenna for radiating a transmission signal from the power amplifier 1220 into a free space and a reception antenna for transferring a reception signal from the free space to the low noise amplifier 1230. Accordingly, the antenna 1210 is configured to operate in both a transmission frequency band and a reception frequency band.

The power amplifier 1220 amplifies a signal from a 5G RF IC and transmits the signal through the patch antenna 100. In this regard, the power amplifier 120 may include a frequency up-converter that receives an intermediate frequency (IF) band signal from the 5G RF IC and converts the received signal into a radio frequency (RF) band signal.

The low noise amplifier 1230 performs low-noise amplification for a signal received through the antenna 1210 and transmits the amplified signal to the 5G RF IC. In this regard, the low-noise amplifier 1230 may include a frequency down-converter that downwardly converts the RF signal of 28 GHz to an IF signal.

On the other hand, when the patch antenna 1210 is configured as an array antenna, the phase shifter 1240 is configured to apply a different phase to each of the elements of the array antenna. In this regard, the phase shifter 1240 is configured to operate in both the transmission frequency band and the reception frequency band. The phase shifter 1240 may adjust a phase in an analog or digital manner. In this regard, the phase shifter 1240 may receive a control signal for a phase control from the 5G BB IC. Also, since an insertion loss is caused due to an internal element, the phase shifter 1240 may control a phase of a signal received from the low-noise amplifier 1230. That is, the phase shifter 1240 may perform the phase control for the signal received in the second antenna system 1200 after the low-noise amplification of the signal through the low-noise amplifier 1230.

The communication system 1300 includes an LTE system which is interfaced with the first antenna system 1100, and a 5G RF IC which is interfaced with the second antenna system 1200. Meanwhile, the LTE system may include a 3G system to support 3G WCDMA fallback or a 2G system. At this time, the first antenna system 1100 may be interfaced with the LTE system through an RF cable or a coaxial cable.

In addition, the communication system 1300 may further include a 5G BB (Base Band) IC, an USIM, and an LPDDR4. Here, the 5G BB IC exchanges baseband signals with the first and second communication systems 1100 and 1200. Here, the 5G BB IC may be interfaced with the 5G RF IC through a 2×MPHY interface, and may be interfaced with the LTE system through a PCIe 1.0 interface. The USIM and the LPDDR4 correspond to a mobile communication user identification module and a memory, respectively.

Meanwhile, since the first antenna system 1100 operates in a lower frequency band than the second antenna system 1200, a wider arrangement interval is required for an independent operation between antenna elements. This is because isolation between the antenna elements is particularly important for operating the antenna elements in the MIMO mode.

Figure 4A:
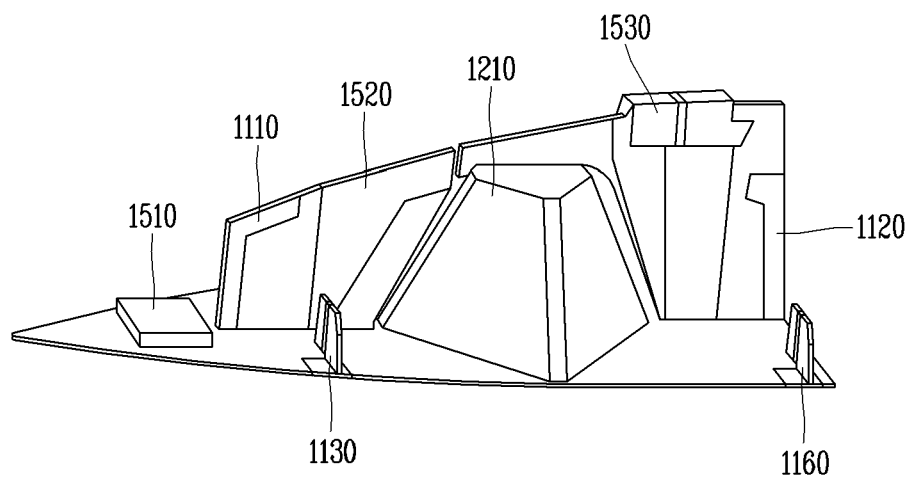
FIGS. 4A to 4C are views illustrating an internal structure of an antenna system loaded in a vehicle according to the present invention.
Figure 4B:
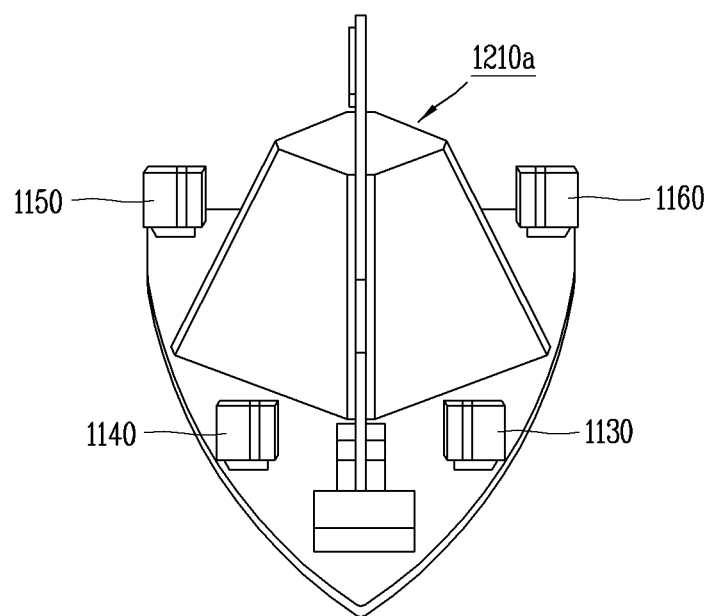
Figure 4C:
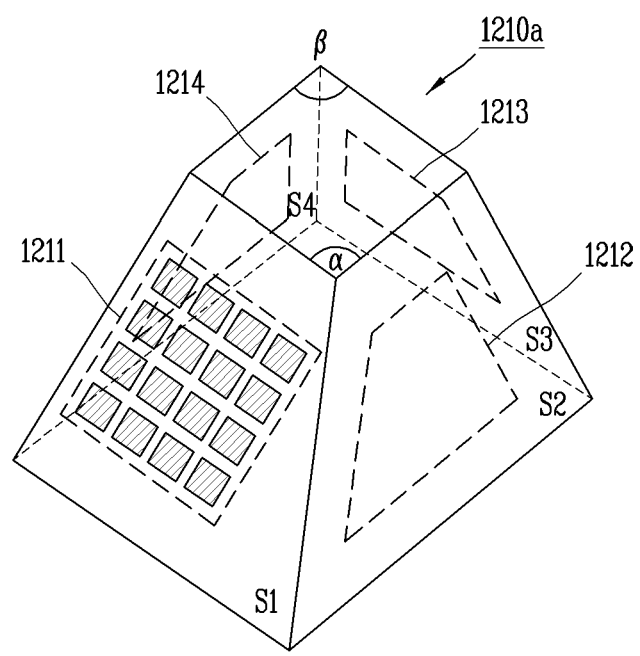

Meanwhile, FIGS. 4A to 4C are views illustrating an internal structure of an antenna system loaded in a vehicle according to the present invention. In detail, FIG. 4A is a left side view showing one side surface on which a plurality of antennas of an antenna system loaded in a vehicle according to the present invention are disposed. On the other hand, FIG. 4B is a front view showing one side surface on which the plurality of antennas of the antenna system loaded in the vehicle according to the present invention are disposed.

Also, FIG. 4C illustrates a polyhedral structure to which 5G array antennas of an antenna system loaded in a vehicle are attached, and an array antenna, according to the present invention.

Referring to FIGS. 3 and 4A to 4C, an antenna system loaded in a vehicle according to the present invention includes a first antenna system 1100 and a second antenna system 1200.

In this regard, the first antenna system 1100 includes a plurality of first antenna elements 1110 and 1120 disposed in a structure loaded in the vehicle to perform a multiple input multiple output (MIMO). On the other hand, the second antenna system 1200 includes a plurality of second antenna elements 1211 to 1214 attached to side surfaces of a polyhedron 1210a disposed in the structure so as to perform beamforming.

The plurality of first antenna elements 1110 and 1120 may be disposed on a substrate, which is erected on the structure at a predetermined angle, at the front and rear of the polyhedron 1210a. At this time, the substrate on which the plurality of first antenna elements 1110 and 1120 are disposed may be formed perpendicular to a lower structure in consideration of coupling with the lower structure and antenna radiation characteristics.

Figure 5A:
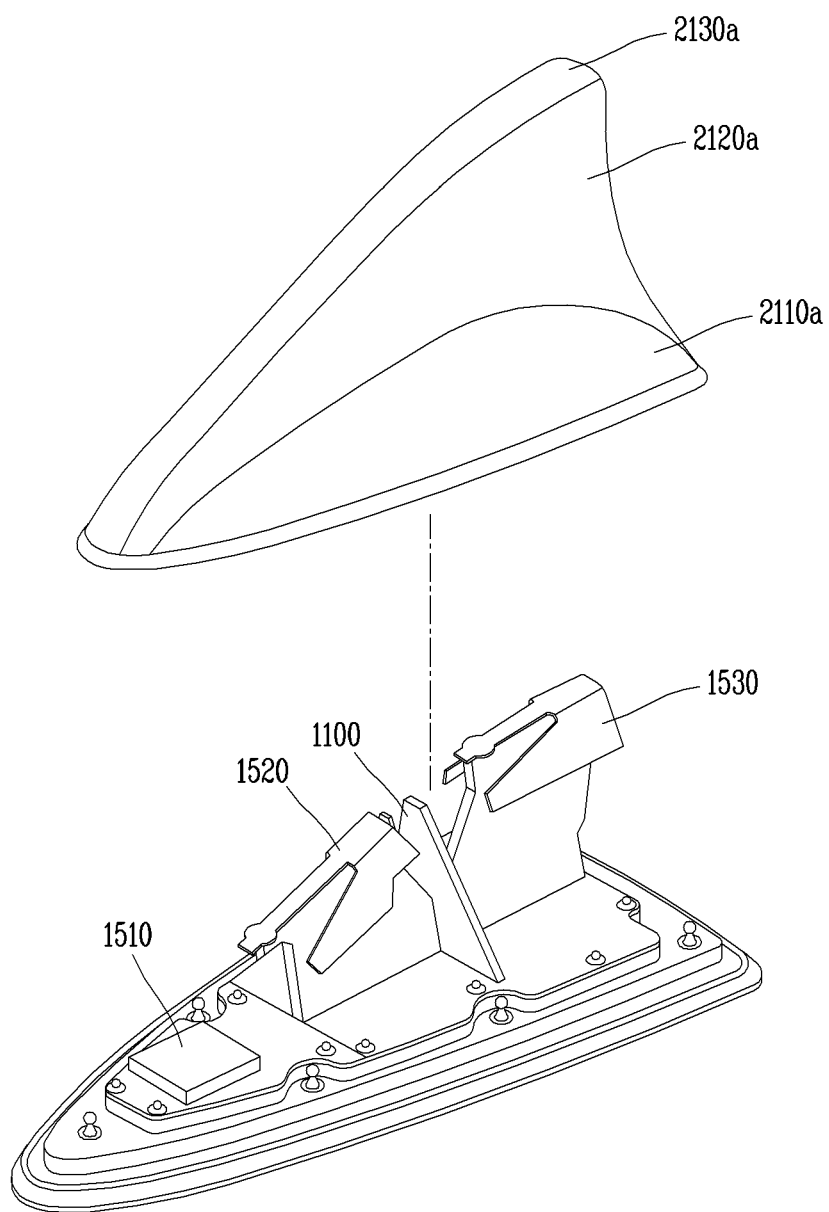
FIGS. 5A to 5C are views illustrating an antenna system and a radome structure in accordance with various embodiments of the present invention.
Figure 5B:
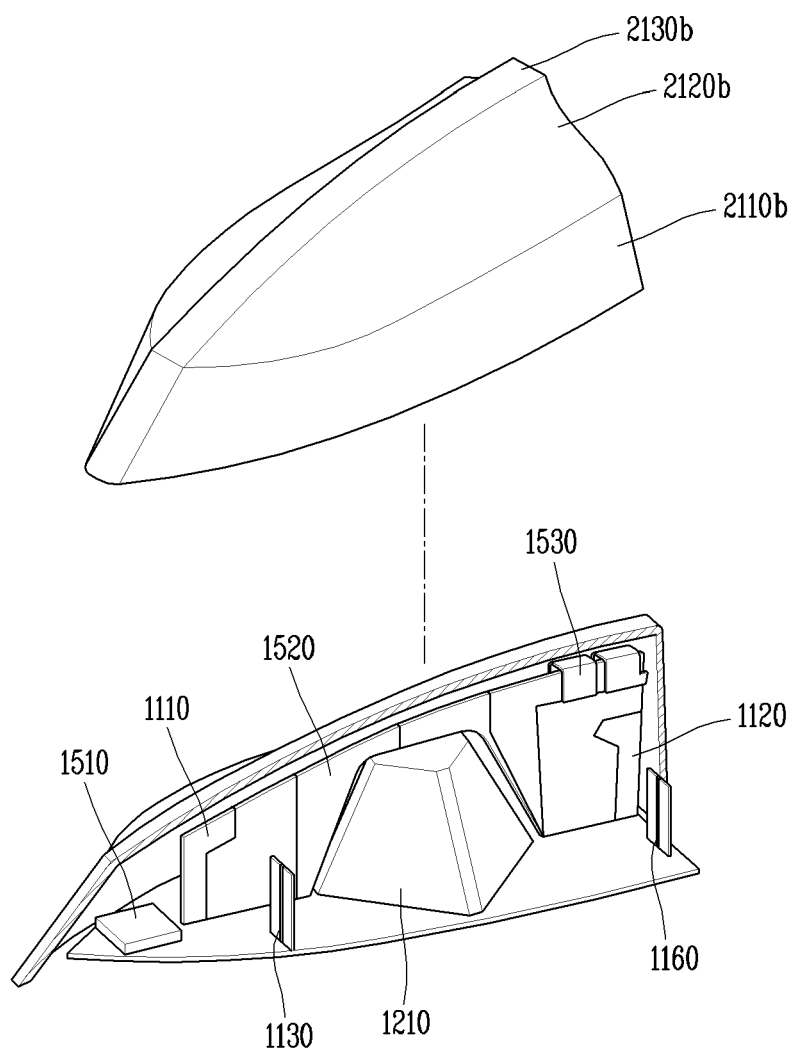
Figure 5C:
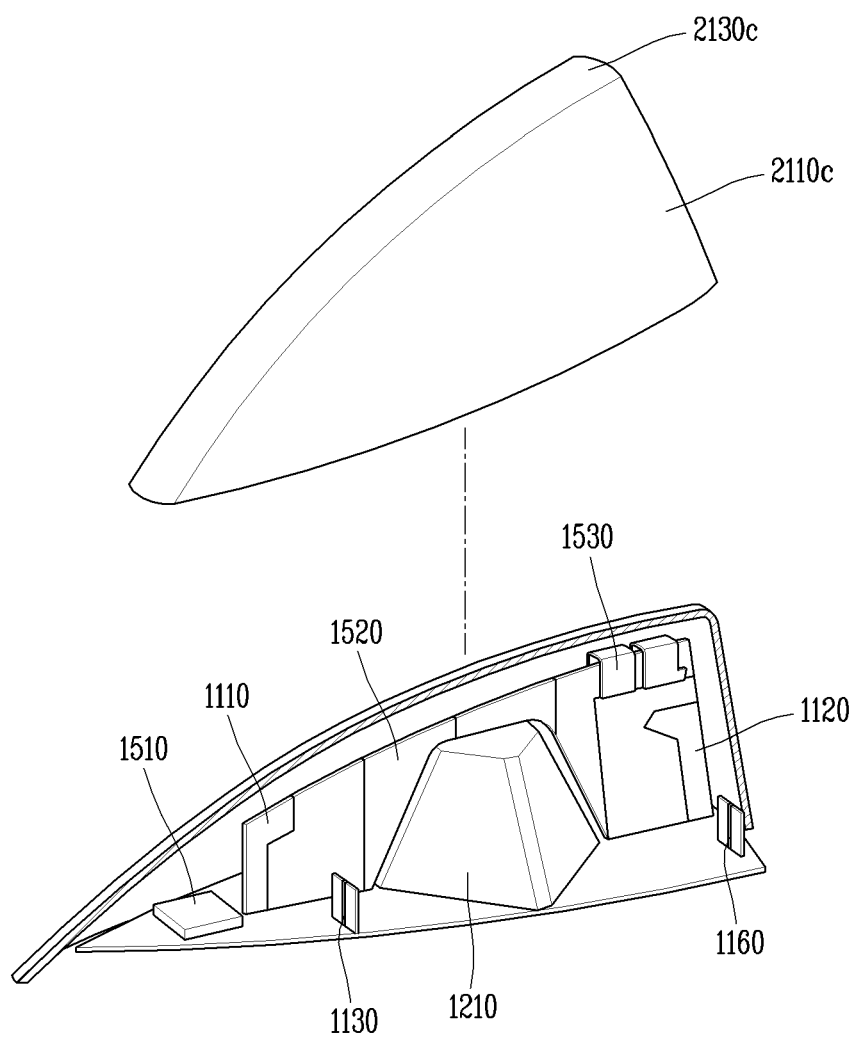

On the other hand, FIGS. 5A to 5C are views illustrating an antenna system and a radome structure in accordance with various embodiments of the present invention.

Referring to FIGS. 3, 4A to 4C, and 5A to 5C, a structure 2110a, 2120a, 2110b, 2120b, 2110c of the antenna system mounted in the vehicle according to the present invention may be configured as a radome in a shape of a shark fin (shark fin-shaped radome).

In detail, referring to FIG. 4C, the plurality of second antenna elements includes first to fourth array antennas 1211 to 1214 attached to four side surfaces S1 to S4 of the polyhedron 1210a. At this time, the first to fourth array antennas 1211 to 1214 may operate to transmit or receive a second signal in a fifth generation (5G) communication system. On the other hand, the first to fourth array antennas 1211 to 1214 may be configured to perform a MIMO operation, or may be configured to cover different directions in an azimuth direction.

A first side surface and a second side surface of the polyhedron 1210a may be arranged to form a first angle α which is a predetermined angle formed in left and right directions with respect to one point of a symmetric line of a bottom surface of the structure. A third side surface and a fourth side surface of the polyhedron 1210a may be arranged to form a second angle β which is a predetermined angle formed in the left and right directions with respect to another point of the symmetric line. In this regard, the first to fourth array antennas 1211 to 1214 may be disposed on the first to fourth side surfaces.

At this time, the first angle α and the second angle β may be set to different values depending on applications. For example, since signal transmission/reception at the front of the vehicle is more important than signal transmission/reception at the rear of the vehicle, the first angle α may be set to be greater than the second angle β. Accordingly, when the first angle α is greater, the first and second array antennas 1211 and 1212 may illuminate a relatively front side and receive signals from the front side.

On the other hand, when the first angle α is smaller, beam coverages of the first and second array antennas 1211 and 1212 may extend to sides, respectively, so that the first and second array antennas can receive signals from the sides, in addition to the front side. However, when the first angle α is smaller, the beam coverages of the first and second array antennas 1211 and 1212 less overlap each other at the front side.

Further, the first angle α and the second angle β may be determined in consideration of interference with the first and second LTE antennas 1110 and 1120. For example, the first angle α may be determined in consideration of interference with the first LTE antenna 1110 attached to a first substrate. Also, the second angle β may be determined in consideration of interference with the second LTE antenna 1120 attached to a second substrate.

Specifically, in order to reduce the interference with the first and second LTE antennas 1110 and 1120, the first angle α and the second angle β may be set to small values. This may result in reducing a width of the polyhedron 1210a in a lateral direction, and reducing interference between different antenna systems. However, since the first and second array antennas 1211 and 1212 cover the sides rather than the front side, the signal transmission/reception performance at the front of the vehicle may be slightly lowered.

On the other hand, referring to FIGS. 4A and 4B, an interface may be formed between the side surfaces of the polyhedron 1210a. Specifically, a first interface may be formed between the first side surface and the second side surface of the polyhedron 1210a, and a second interface may be formed between the third side surface and the fourth side surface.

At this time, substrates of different antennas may be disposed on areas of the first and second interfaces. Specifically, a width of the first interface may be set wider than a width of a first substrate (which is perpendicularly erected on the structure) disposed at the front of the polyhedron 1210a. In addition, a width of the second interface may be set to be wider than a width of a second substrate (which is perpendicularly erected on the structure) disposed at the rear of the polyhedron 1210a. Therefore, as illustrated in FIG. 4B, the first and second substrates are not recognized as obstacles in front and rear viewable areas of the polyhedron 1210a. Accordingly, interference between antennas of a plurality of different antenna systems can be reduced.

Meanwhile, the antenna system loaded in the vehicle according to the present invention may be provided with a plurality of antennas providing various functions, in addition to the LTE antenna and the 5G antenna. It is important that the plurality of antennas providing such various functions is optimally placed so as to minimize interference with the existing LTE antenna and 5G antenna.

In this regard, the antenna system loaded in the vehicle according to the present invention may include a GPS antenna 1510, a satellite broadcasting (Digital Multimedia Broadcasting; DMB) antenna 1520, an FM receiving antenna 1530, and the like. However, the present invention is not limited to these antennas, and various antennas may be disposed depending on applications.

Specifically, the satellite broadcasting (DMB) antenna 1520 may be attached to a third substrate perpendicularly erected on the structure, between the first LTE antenna 1110 and the polyhedron 1210a. At this time, an operating frequency band of the satellite broadcasting (DMB) antenna 1520 is different from those of the LTE antenna and the 5G antenna, and no interference is caused between these antennas.

On the other hand, the FM receiving antenna 1530 may be attached to a fourth substrate perpendicularly erected on the structure, between the second LTE antenna 1120 and the polyhedron 1210a. At this time, an operating frequency band of the FM receiving antenna 1530 is different from the operating frequency bands of the LTE antenna and the 5G antenna, and no interference is caused between these antennas.

Meanwhile, the GPS antenna 1510 may be disposed at the front of the satellite broadcast (DMB) antenna 1520. In this regard, it is important to recognize a position of the vehicle according to a reception of a GPS signal, and thus interference between different antennas should be considered. In particular, back-off of transmission power through the LTE antenna must be performed when the GPS signal is received.

In addition, the GPS antenna 1510 is disposed at the foremost of the structure loaded in the vehicle, which may result in minimizing a problem that the GPS antenna 1510 is minimized from being obscured due to other antennas or structures. Further, unlike other antennas, the GPS antenna 1510 is arranged on the bottom surface of the structure, which may result in minimizing interference with other antennas. To this end, the GPS antenna may be configured as a patch antenna printed on a substrate disposed on a bottom surface of the structure.

Meanwhile, the antenna system loaded in the vehicle according to the present invention may further be provided with another type of antenna operating in the 5G communication system. In this regard, referring to FIGS. 4A and 4B, a plurality of third antenna elements 1130 to 1160 may additionally be disposed inside the structure. Specifically, the plurality of third antenna elements 1130 to 1160 may be disposed on a plurality of substrates, respectively, which are erected perpendicularly on the bottom surface of the structure with being spaced apart from the four side surfaces of the polyhedron 1210a, respectively, by predetermined distances.

In relation to the 5G antenna, the plurality of second antenna elements 1210 including the first to fourth array antennas 1211 to 1214, which operate in the aforementioned millimeter wave (mmWave) band, also operates in the millimeter wave (mmWave) band. On the other hand, the plurality of third antenna elements 1130 to 1160 may include first to fourth sub-6 antennas 1130 to 1160 which operate in a sub-6 band of 6 GHz or less.

At this time, the first to fourth sub-6 antennas 1130 to 1160 may also operate in an LTE band in addition to the sub-6 band. Accordingly, the first to fourth sub-6 antennas 1130 to 1160 may transmit or receive a first signal of a first communication system, which is an LTE communication system, in a first frequency band. In addition, the first to fourth sub-6 antennas 1130 to 1160 may transmit or receive a second signal in a second communication system, which is a 5G communication system, in a second frequency band different from the first frequency band.

On the other hand, the first to fourth sub-6 antennas 1130 to 1160 disposed on an outer portion of the structure where the antennas are disposed should be arranged in a manner that an influence on propagation loss characteristics and the like by the radome is minimized. Accordingly, the plurality of substrates on which the first to fourth sub-6 antennas 1130 to 1160 are disposed may be provided in a manner that the outermost portions thereof are located on the bottom surface of the shark fin-shaped structure inside the structure.

Figure 6:
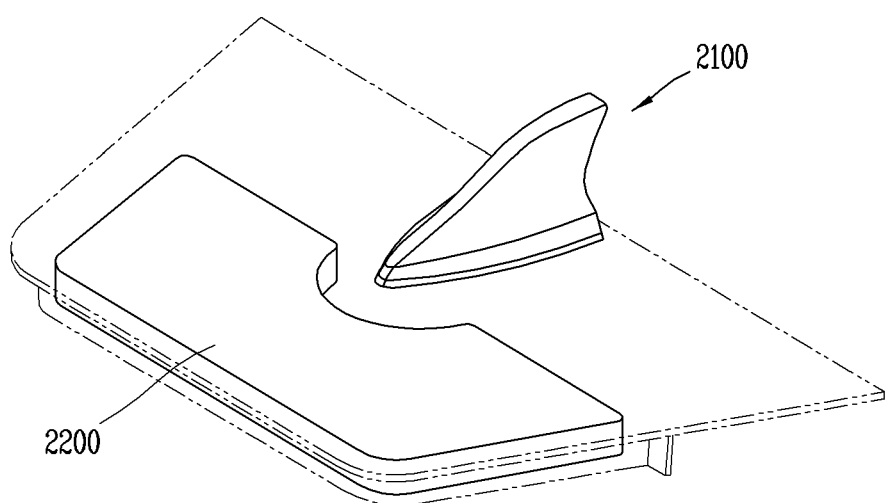
FIG. 6 is a view illustrating an antenna system loaded in a vehicle having a plurality of structures in accordance with various embodiments of the present invention.

Hereinafter, an antenna system loaded in a vehicle according to another aspect of the present invention will be described. In this regard, FIG. 6 is a view illustrating an antenna system loaded in a vehicle having a plurality of structures in accordance with various embodiments of the present invention. Referring to FIGS. 3 and 6, an antenna system loaded in a vehicle includes a first antenna system 1100 and a second antenna system 1200.

In this regard, the first antenna system 1100 is configured such that a first antenna element disposed in a first structure 2100 mounted in the vehicle transmits or receives a first signal. On the other hand, the second antenna system 1200 is configured such that a plurality of second antenna elements disposed in a second structure 2200 transmits or receives a second signal. At this time, the second structure 2200 may be separated (or spaced apart) from the first structure 2100 and attached to an antenna system separately loaded in the vehicle. Alternatively, the second structure 2200 may be configured as a module separated from the first structure 2100, and the first structure 2100 and the second structure 2200 may be assembled into a single antenna system.

On the other hand, referring to FIGS. 4A to 4C and FIGS. 5A to 5C, the plurality of first antenna elements 1110 and 1120 may be provided on the substrate which is erected (set) at a predetermined angle within the first structure 2100.

At this time, the first structure 2100 is configured as a shark fin-shaped radome, and the second structure 2200 may be provided with a coupling portion to which the shark fin-shaped radome can be attached.

Meanwhile, the first to fourth array antennas, which are the plurality of second antenna elements, may be disposed in a flat structure of the second structure 2200. The first to fourth array antennas may operate to transmit or receive the second signal through beamforming in the 5G communication system. At this time, the first to fourth array antennas may be configured as flat patch antennas instead of a shape attached to the polyhedron 1210*a* as illustrated in FIG. 4C, in order to be disposed within the flat structure.

Meanwhile, the second antenna system 1200 as well as the first to fourth array antennas may be disposed in the second structure 2200. In addition, a telematics module or a communication module corresponding to a communication system 1300 may be provided in the second structure 2200. The communication system 1300 and a controller (processor) controlling the same may allow communication using a heterogeneous communication system to be performed in the vehicle through the first antenna system 1100 and the second antenna system 1200.

On the other hand, referring to FIGS. 4A, 4B and 6, a first substrate and a second substrate, on which the first antenna element 1110 and the second antenna element 1210 are printed, may be arranged to be perpendicular to a bottom surface of the first structure 2100 within the first structure 2100. Accordingly, the first substrate and the second substrate can be arranged in a lengthwise direction of the first structure 2100, thereby minimizing a width of the first structure 2100. The first structure 2100 having the minimized width can also be reduced in length as the 5G array antennas are disposed in the separate second structure 2200. Accordingly, there is an advantage in that a volume of the shark fin-shaped first structure 2100 protruding to outside of the vehicle is reduced.

On the other hand, as described above, the plurality of antennas performing various different functions may be disposed in the first structure. In this regard, the satellite broadcasting (DMB) antenna 1520 attached to a third substrate, which is perpendicularly erected on the first structure 2100, may be disposed at the rear of the first antenna element 1110 within the first structure 2100.

Also, the FM receiving antenna 1530 attached to a fourth substrate, which is perpendicularly erected on the first structure 2100, may be further disposed at the rear of the satellite broadcasting (DMB) antenna 1520 within the first structure 2100. In addition, the GPS antenna 1510 may be further disposed at the front of the satellite broadcasting (DMB) antenna 1520 and the first antenna element 1110. At this time, as described above, the GPS antenna 1510 may be configured as the patch antenna printed on the substrate disposed on the bottom surface of the first structure 2100.

Referring to FIGS. 5A, 5B, and 6, the first structure 2100 corresponding to the shark fin-shaped radome may include a base radome 2110*a*, 2110*b* and an upper radome 2120*a*, 2120*b*.

Specifically, the base radome 2110*a*, 2110*b* is configured to be coupled to the bottom surface of the second structure 2200. The upper radome 2120*a*, 2120*b* may be formed integrally with the base radome 2110*a*, 2110*b*.

Referring to FIG. 5B, the upper radome 2120*b* may be formed in a curved shape to accommodate the polyhedral structure 1210*a*. On the other hand, referring to FIG. 5A, the polyhedral structure 1210*a* is not disposed. Accordingly, the upper radome 2120*a* may be formed in a curved shape corresponding to a shape in which the satellite broadcasting (DMB) antenna 1520 is accommodated at a corresponding position.

In addition, the first structure 2100 may further include a flat portion 2130*a*, 2130*b*, 2130*c* on an upper portion thereof. At this time, the flat portion 2130*a*, 2130*b*, 2130*c* has a central portion formed in a flat shape in order to prevent scattering of radio waves in the vicinity of an upper central portion of the upper radome 2110*a*, 2110*b*, 2110*c*.

Referring to FIG. 5C and FIG. 6, the first structure 2100 may be configured as one radome 2110*c* with one curved shape, other than different curved shapes like the base radome and the upper radome.

The foregoing description has been given of an antenna system loaded in a vehicle having first and second antenna systems, and more particularly, an antenna system loaded in a shark fin-shaped radome.

With the configuration and the antenna arrangement structure, the present invention can provide a flat vehicle antenna capable of providing not only existing mobile communication services but also next generation communication services, a design thereof, and a control method thereof.

Hereinafter, effects of an antenna system loaded in a vehicle and a method of controlling the same according to the present invention will be described.

According to at least one embodiment of the present invention, it is possible to provide an antenna arrangement structure in which isolation characteristics between antenna elements are optimized in a flat vehicle antenna having an LTE antenna system and a 5G antenna system.

In addition, according to at least one embodiment of the present invention, the present invention provides a module-type flat vehicle antenna system in which various basic structures of the flat vehicle antenna system can extend to an extended structure.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

The antenna system and the controller (modem or application processor) controlling the same can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. An antenna system configured to be provided in or on a vehicle, the antenna system comprising:
a first antenna system having a plurality of first antenna elements disposed within a structure configured to be mounted in or on the vehicle, the plurality of first antenna elements being configured to perform Multi Input Multi Output (MIMO) communication; and
a second antenna system having a plurality of second antenna elements attached to side surfaces of a polyhedron disposed inside the structure, the plurality of second antenna elements being configured to perform beamforming,
wherein the plurality of first antenna elements are disposed on first substrates arranged on the structure at a predetermined angle, and
wherein the first substrates having the plurality of first antenna elements are located at front and rear sides of the polyhedron.

2. The antenna system of claim 1, wherein the structure is configured as a shark fin-shaped radome.

3. The antenna system of claim 2, wherein the plurality of second antenna elements includes first, second, third and fourth array antennas attached to four side surfaces of the polyhedron, and
wherein the first, second, third and fourth array antennas are configured to transmit or receive a second signal according to a fifth generation (5G) communication system.

4. The antenna system of claim 3, wherein the polyhedron has first and second side surfaces arranged to form a first angle in left and right directions with respect to one point of a symmetric line of a bottom surface of the structure,
wherein the polyhedron has third and fourth side surfaces arranged to form a second angle in the left and right directions with respect to another point of the symmetric line, and
wherein the first, second, third and fourth array antennas are disposed on the first, second, third and fourth side surfaces of the polyhedron.

5. The antenna system of claim 4, wherein the first side surface and the second side surface have a first interface formed therebetween,
wherein the third side surface and the fourth side surface have a second interface formed therebetween,
wherein the first interface has a width wider than a width of at least one of the first substrates perpendicularly arranged on the structure at the front side of the polyhedron, and
wherein the second interface has a width wider than a width of another one of the first substrates perpendicularly arranged on the structure at the rear side of the polyhedron.

6. The antenna system of claim 4, wherein the first angle is determined in consideration of interference with a first LTE antenna attached to one of the first substrates, and
wherein the second angle is determined in consideration of interference with a second LTE antenna attached to another one of the first substrates.

7. The antenna system of claim 2, wherein the shark fin-shaped radome comprises:
a base radome coupled to the lower surface of the first structure; and
an upper radome formed integrally with the base radome and having a curved shape to accommodate the polyhedron therein,
wherein the base radome and the upper radome each include a flat portion formed in a flat shape at a central portion thereof to prevent scattering of radio waves in a vicinity of the central portion.

8. The antenna system of claim 6, further comprising a satellite broadcasting (Digital Multimedia Broadcasting; DMB) antenna attached to a third substrate perpendicularly arranged on the structure between the first LTE antenna and the polyhedron.

9. The antenna system of claim 8, further comprising a GPS antenna disposed in front of the satellite broadcasting (DMB) antenna, and
wherein the GPS antenna is a patch antenna printed on a substrate disposed on a lower portion of the structure.

10. The antenna system of claim 6, further comprising an FM antenna attached to a fourth substrate perpendicularly arranged on the structure between the second LTE antenna and the polyhedron.

11. The antenna system of claim 1, further comprising a plurality of third antenna elements respectively disposed on a plurality of third substrates perpendicularly arranged on the structure, wherein the plurality of third antenna elements are spaced apart from four side surfaces of the polyhedron by predetermined distances.

12. The antenna system of claim 11, wherein the plurality of second antenna elements is first, second, third and fourth array antennas configured to operate in a millimeter wave (mmWave) band, and wherein the plurality of third antenna elements is first, second, third and fourth sub-6 antennas configured to operate in a sub-6 band of 6 GHz or less.

13. The antenna system of claim 12, wherein the first, second, third and fourth sub-6 antennas are configured to transmit or receive a first signal according to a first communication system as an LTE communication system in a first frequency band, and wherein the first, second, third and fourth sub-6 antennas are further configured to transmit or receive a second signal according to a second communication system as a 5G communication system in a second frequency band different from the first frequency band.

14. The antenna system of claim 12, wherein the plurality of third substrates have outermost portions disposed on a lower surface of the structure in a shark fin shape within the structure.

15. An antenna device configured to be provided on or in a vehicle, the antenna device comprising:

a first antenna system having a plurality of first antenna elements disposed within a first structure configured to be mounted on or in the vehicle, the first antenna system being configured to transmit or receive a first signal; and a second antenna system having a plurality of second antenna elements disposed in a second structure attached the first structure, the second antenna system being configured to transmit or receive a second signal, wherein the plurality of first antenna elements is provided on first substrates arranged on the first structure at predetermined angles, the first substrates being disposed at front and rear sides of a polyhedron.

16. The antenna device of claim 15, wherein the first structure is configured as a shark fin-shaped radome, and the second structure is provided with a coupling portion attached to the shark fin-shaped radome.

17. The antenna device of claim 15, wherein the plurality of second antenna elements are first, second, third and fourth array antennas disposed in a flat structure of the second structure, and wherein the first, second, third and fourth array antennas are configured to transmit or receive a second signal through beamforming according to a fifth generation (5G) communication system.

18. The antenna device of claim 15, wherein at least one of the first substrates is disposed perpendicularly on a lower surface within the first structure, and wherein a thickness direction of the first substrate is arranged in a lengthwise direction of the first structure to minimize a length of the first structure.

19. The antenna device of claim 15, further comprising:

a satellite broadcasting (Digital Multimedia Broadcasting; DMB) antenna attached to a third substrate perpendicularly arranged on the first structure at a front side of the first antenna element; and an FM antenna attached to a fourth substrate perpendicularly arranged on the first structure at a rear side of the first antenna element.

20. The antenna device of claim 19, wherein a GPS antenna is disposed at the front side of the satellite broadcasting (DMB) antenna, and wherein the GPS antenna is a patch antenna printed on a substrate disposed on a lower surface of the first structure.

* * * * *